United States Patent
Kudenov

(10) Patent No.: US 9,046,422 B2
(45) Date of Patent: Jun. 2, 2015

(54) ULTRA-COMPACT SNAPSHOT IMAGING FOURIER TRANSFORM SPECTROMETER

(75) Inventor: Michael W. Kudenov, Tucson, AZ (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 440 days.

(21) Appl. No.: 13/452,686

(22) Filed: Apr. 20, 2012

(65) Prior Publication Data
US 2012/0268745 A1 Oct. 25, 2012

Related U.S. Application Data

(60) Provisional application No. 61/517,481, filed on Apr. 20, 2011, provisional application No. 61/517,774, filed on Apr. 25, 2011.

(51) Int. Cl.
| G01J 3/45 | (2006.01) |
| G01J 3/453 | (2006.01) |
| G01J 3/28 | (2006.01) |
| G01J 3/02 | (2006.01) |
| G01J 3/447 | (2006.01) |

(52) U.S. Cl.
CPC ............. *G01J 3/4531* (2013.01); *G01J 3/2803* (2013.01); *G01J 3/0208* (2013.01); *G01J 3/0229* (2013.01); *G01J 2003/452* (2013.01); *G01J 3/447* (2013.01)

(58) Field of Classification Search
CPC ............. G01J 3/447; G01J 3/45; G01J 3/453; G01J 3/4531; G01J 3/0229; G01J 3/2803; G01J 2003/452; A61B 9/02091; A61B 5/0066
USPC ............. 356/327, 322, 451–456, 491
See application file for complete search history.

(56) References Cited

U.S. PATENT DOCUMENTS

| 5,781,293 | A | 7/1998 | Padgett et al. |
| 6,674,532 | B2 | 1/2004 | VanDelden |
| 6,687,007 | B1 | 2/2004 | Meigs |
| 2003/0142318 | A1* | 7/2003 | Kuiseko ........................ 356/456 |
| 2005/0237532 | A1* | 10/2005 | Beale et al. ................... 356/453 |
| 2006/0250616 | A1 | 11/2006 | Pettipiece et al. |
| 2008/0278675 | A1 | 11/2008 | Escuti et al. |
| 2010/0110363 | A1 | 5/2010 | Escuti et al. |
| 2010/0171952 | A1* | 7/2010 | DeFlores et al. .............. 356/327 |
| 2010/0225856 | A1 | 9/2010 | Escuti et al. |

OTHER PUBLICATIONS

Jihwan Kim, Snapshot imaging spectropolarimeter utilizing polarization gratings, Aug. 27, 2008, SPIE, vol. 7086, pp. 1-9.*
Courtial et al., "Design of a Static Fourier-Transform Spectrometer with Increased Field of View," App. Opt. 35(34):6698-6702 (Dec. 1, 2006).

(Continued)

*Primary Examiner* — Tarifur Chowdhury
*Assistant Examiner* — Michael P Lapage
(74) *Attorney, Agent, or Firm* — Klarquist Sparkman, LLP

(57) ABSTRACT

Snapshot imaging Fourier transform spectrometers include a lens array that produces sub-images that are directed through a birefringent interferometer in orthogonal polarization eigenstates that acquire an optical path difference. Interference patterns based on this OPD can be Fourier transformed to obtain a spectral image. In some examples, polarizing gratings provide a spatial heterodyne frequency and offset the spectra.

16 Claims, 12 Drawing Sheets

(56) References Cited

OTHER PUBLICATIONS

Hirai et al., "Application of Multiple-Image Fourier Transform Spectral Imaging to Fast Phenomena," *Opt. Rev.* 1:205-207 (1994).

The Art and Science of Amateur Experimentalism, Sciencemadness Discussion Board, http://www.sciencemadness.org/talk/viewthread.php?tid=13554, downloaded Apr. 15, 2012.

Crawford et al., "Liquid-crystal diffraction gratings using polarization holography alignment techniques," *J. Appl. Phys.*, 98:123102 (2005).

Escuti et al., "Simplified Spectropolarimetry Using Reactive Mesogen Polarization Gratings," *Proc. SPIE*, 6302:630207 (2006).

Kudenov, et al., "Prismatic imaging polarimeter calibration for the infrared spectral region," *Opt. Exp.*, 16(18):13720-13737 (2008).

Kudenov et al., "White-Light Channeled Imaging Polarimetry Using Broadband Polarization Gratings,"*Appl. Opt.*, 50:2283-2293 (2011).

Kudenov, et al., "White light Sagnac interferometer for snapshot linear polarimetric imaging," *Opt. Exp.*, 17(25):22520-22534 (2009).

Luo et al., "Compact and miniature snapshot imaging polarimeter," *Applied Optics*, 47(24):4413-4417 (2008).

Luo, "Snapshot Imaging Polarimeters Using Spatial Modulation," Ph.D. Dissertation, College of Optical Science, University of Arizona, (May 2008).

Mujat et. al., "Interferometric imaging polarimeter," *JOSA A*:21:2244-2249 (2004).

Oh and Escuti, "Achromatic Diffraction from Polarization Gratings with High Efficiency," *Opt. Lett.*, 33:2287-2289 (2008).

Oh and Escuti, "Numerical Analysis of Polarization Gratings Using the Finite-Difference Time-Domain Method," *Phys. Rev. A*, 76(4):043815 (2007).

Oka and Kaneko, "Compact complete imaging polarimeter using birefringent wedge prisms," *Opt. Exp.* 11:1510-1519 (2003).

Oka and Saito, "Snapshot complete imaging polarimeter using Savart plates," *Proc. SPIE*, 6295:629508 (2006).

Snik et al., "Spectral Modulation for Full Linear Polarimetry," *Appl. Opt.*, 48(7):1337-1346 (2009).

Tyo et al., "Review of Passive Imaging Polarimetry for Remote Sensing Applications," *Appl. Opt.*, 45(22):5453-5469 (2006).

Walraven R., "Polarization Imagery," *Optical Engineering*, 20(1):014-018 (1981).

Wang et al., "Anisotropic Wet Etching on Birefringent Calcite Crystal," *Appl. Phys. A*, 81:851-854 (2005).

Wyant, "OTF Measurements with a White Light Source: An Interferometric Technique," *App. Opt.*, 14:1613-1615 (1975).

* cited by examiner

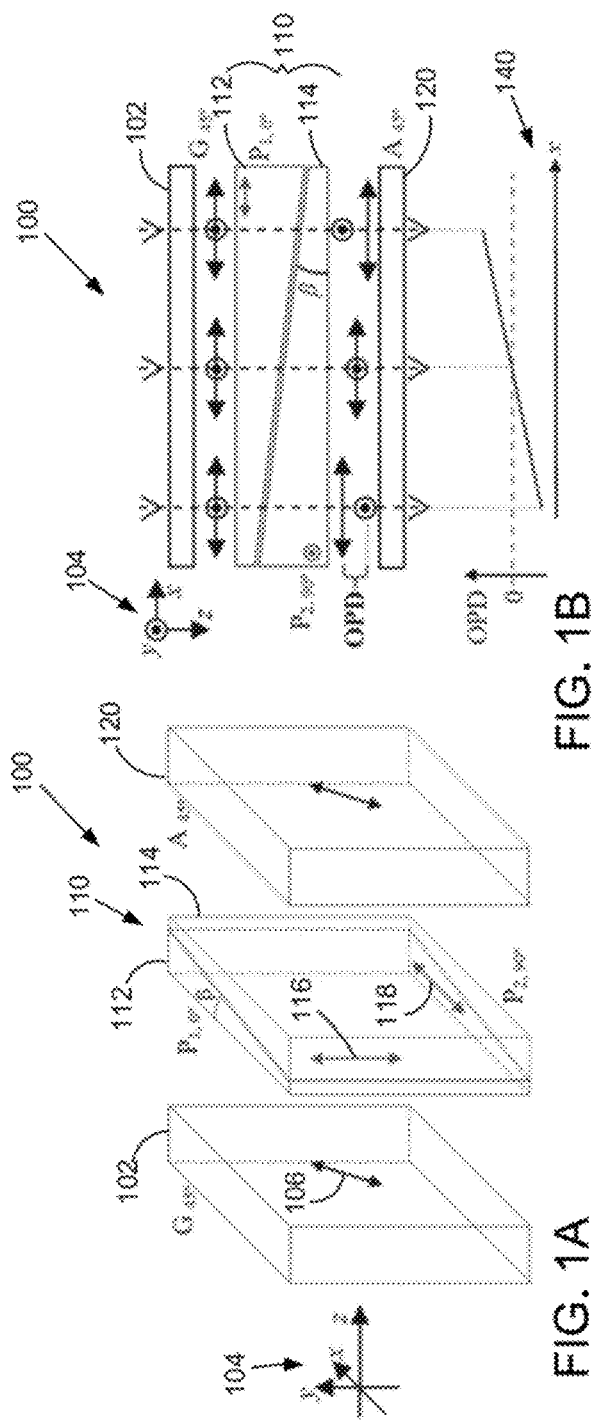

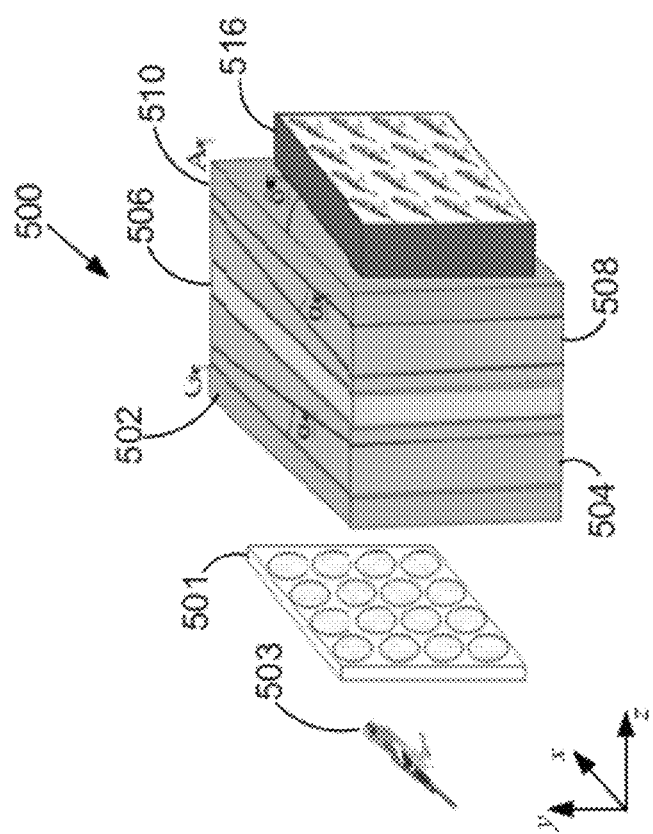
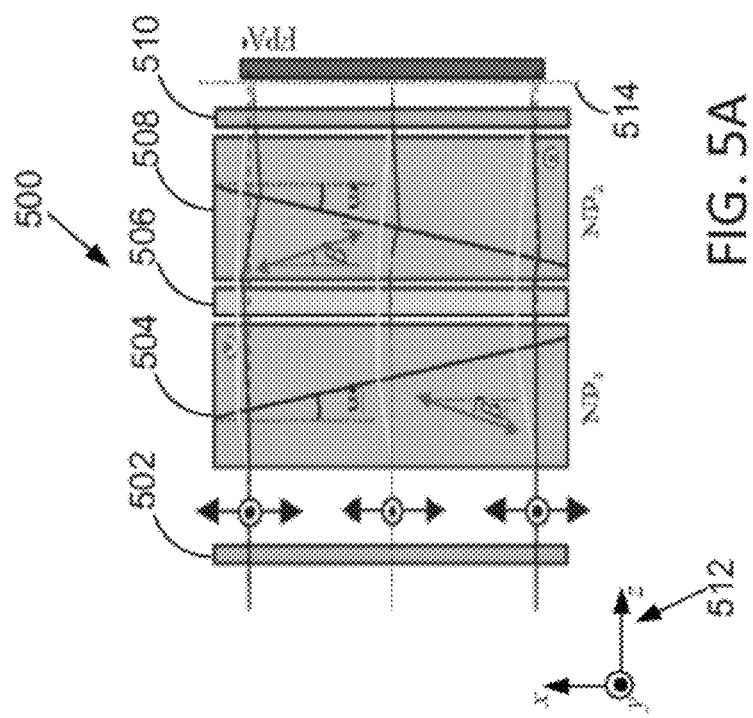

FIG. 10
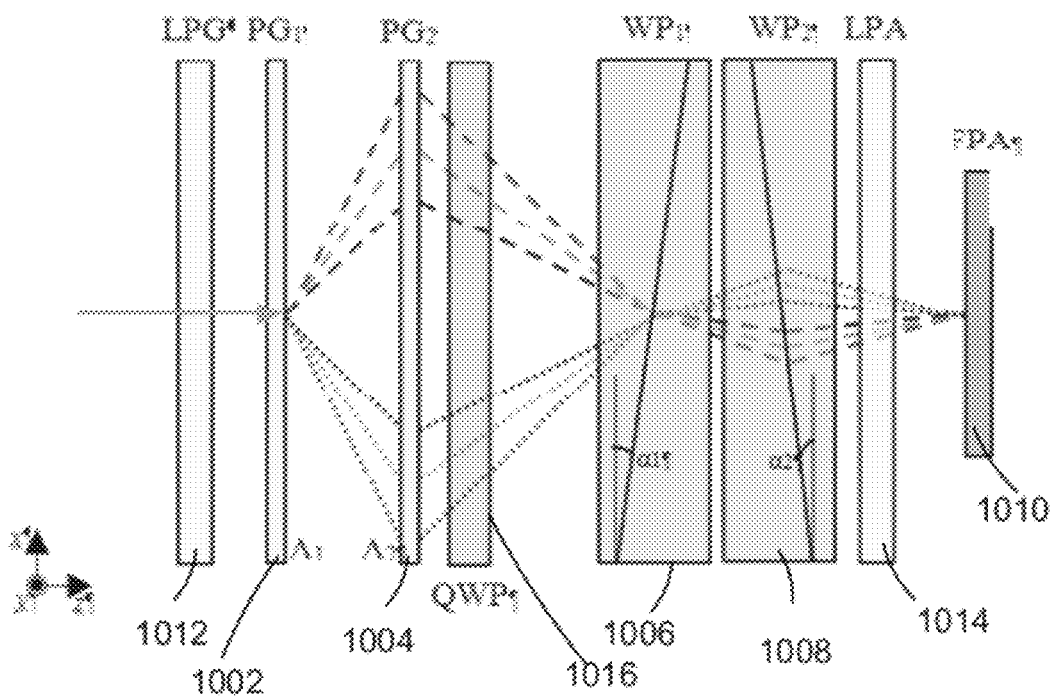
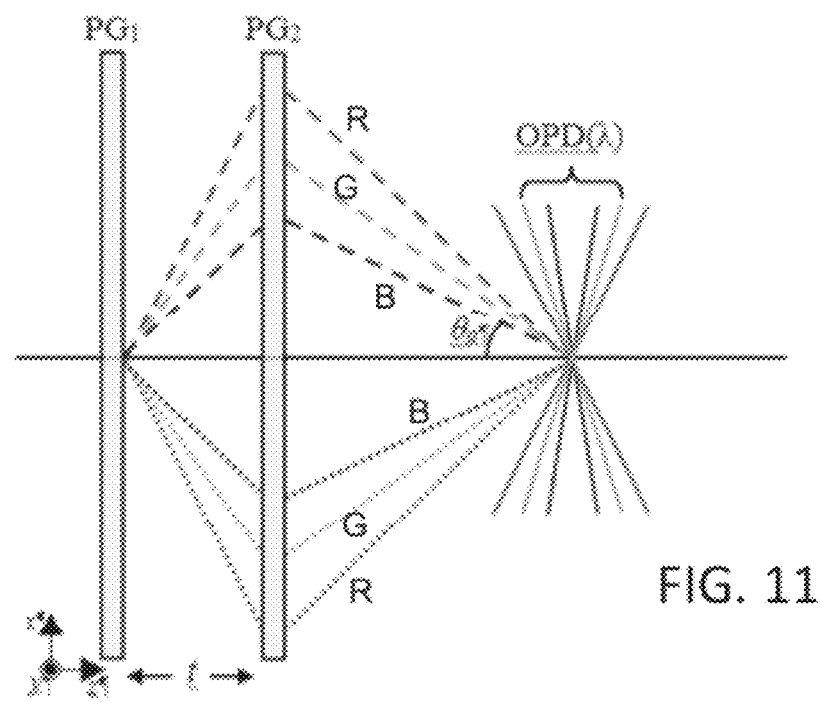
FIG. 11

ULTRA-COMPACT SNAPSHOT IMAGING FOURIER TRANSFORM SPECTROMETER

CROSS REFERENCE TO RELATED APPLICATION

This application claims the benefit of U.S. Provisional Applications 61/517,481, filed Apr. 20, 2011 and 61/517,774, filed Apr. 25, 2011, both of which are incorporated herein by reference.

ACKNOWLEDGMENT OF GOVERNMENT SUPPORT

This invention was made with government support under Grant No. W56HZV-07-P-1148, awarded by United States Army TACOM LCMC. The government has certain rights in the invention.

FIELD

The disclosure pertains to imaging spectrometers.

BACKGROUND

Several types imaging interferometers have been developed. Some, such as those based on Sagnac or Michelson interferometers, require either spatial scanning or temporal scanning. A snapshot imaging interferometer known as a Multiple-Image Fourier Transform Spectrometer (MFTS) has been demonstrated by Hirai et al., "Application of Multiple-Image Fourier Transform Spectral Imaging to Fast Phenomena," Opt. Rev. 1:205-207 (1994), which is incorporated herein by reference. The MFTS relies on optically replicating an image of an object using a lens array to produce an array of sub-images. These sub-images are transmitted into a modified Michelson interferometer with a tilted mirror to generate a spatially-dependent optical path difference (OPD). Reimaging each of these sub-images onto a focal plane array enables calculation of the 3D datacube within a single snapshot. However, the MFTS is sensitive to misalignments and vibration, and requires large focal-ratio imaging lenses. Accordingly, alternative imaging interferometers are needed that are suitable for practical implementations.

SUMMARY

Disclosed herein are common-path birefringent interferometers and associated methods for snapshot imaging Fourier transform spectrometry.

In some examples, interferometers comprise, from objectwise to image-wise along an axis, a lens or lenslet array configured to produce a plurality of sub-images of an object based on associated sub-image light fluxes. A birefringent prism is configured to produce a spatially varying optical path difference (OPD) between orthogonal polarization states associated with the sub-image light fluxes. A polarization analyzer is situated to project at least a portion of orthogonal polarization states of the sub-image light fluxes to a common polarization state. An array detector is situated to receive the projected sub-image light fluxes. In some examples, the birefringent prism is a Wollaston prism to produce an OPD that varies linearly parallel to the Wollaston prism's wedge. In other examples, an input polarizer is situated to receive light fluxes associated with the sub-images from the object, wherein the input polarizer is oriented to polarize the light fluxes so that at least a portion of the polarized light flux is associated with ordinary ray propagation and extraordinary ray propagation in the Wollaston prism. In further embodiments, the birefringent prism includes a first Wollaston prism and a second Wollaston prism and a half-wave retarder is situated between the first and second Wollaston prisms and oriented so as to exchange polarization directions for the sub-image light fluxes received from the first Wollaston prism and directed to the second Wollaston prism. In other typical examples, at least one polarizing grating is situated to produce a spatial frequency offset in an interference pattern detected by the array detector. In representative examples, the spatial frequency offset is based on a period of the polarizing grating.

In some embodiments, the first and second Wollaston prisms are situated so as to be fringe localization compensated (FLC) prisms. In other examples, the birefringent prism includes a first prism pair and a second prism pair, wherein the first and second prism pairs are situated so as to be fringe localization compensated (FLC) prisms. In some examples, the prism pairs are Nomarski prisms or Wollaston prisms. In still additional examples, a processor is coupled to store recorded sub-images based on the sub-image light fluxes received at the array detector and process the recorded sub-images to produce a spectral image based on a Fourier transformation of the recorded sub-images.

Spectral imaging methods comprise directing a plurality of sub-image light fluxes associated with an object to a birefringent prism so as to produce optical path differences between orthogonal states of polarization of the sub-image light fluxes. The sub-image light fluxes with the optical path differences are transmitted to a polarization analyzer, and intensity patterns based on the polarization analyzed sub-image light fluxes are recorded. The recorded intensity patterns are processed so as to produce a spectral image of the object. In typical examples, the birefringent prism is configured to provide a spatially linearly varying optical path difference along one or two orthogonal directions between the orthogonal states of polarization. In some examples, the birefringent prism is one or more Wollaston prisms. In other examples, the sub-image light fluxes are polarized with a polarization generator, and the polarized sub-image light fluxes are directed to the birefringent prism. In typical examples, the spectral image is produced based on a Fourier transformation of the recorded sub-images. In other embodiments, the sub-image light fluxes are directed to a polarizing grating, and the Fourier transformation of the recorded sub-images is frequency offset based on a period of the polarizing grating. In typical embodiments, the sub-image light fluxes correspond to sub-images of the object produced by a lens array.

In other examples, spectral image apparatus comprise, along an axis from an object, a lens or lenslet array configured to produce a plurality of sub-images of an object associated with sub-image light fluxes. A polarization generator is configured to polarize the sub-image light fluxes. A birefringent prism pair is situated to receive the polarized sub-image light fluxes such that the sub-image light fluxes propagate in the birefringent prism pair in at least two eigenpolarizations. A quarter wave retarder is situated to receive the sub-image light fluxes from the birefringent pair and produce corresponding circularly polarized light fluxes. A polarization grating is situated to receive the circularly polarized light fluxes and produce corresponding diffracted light fluxes. An array detector is configured to record the diffracted light fluxes. A processor is configured to produce a spectral image based on a Fourier transform of the diffracted light fluxes, wherein the Fourier transform exhibits a spatial heterodyne frequency based on a period of the polarizing grating.

The foregoing and other features and advantages of the technology will become more apparent from the following detailed description, which proceeds with reference to the accompanying figures.

BRIEF DESCRIPTION OF THE DRAWINGS

FIGS. 1A-1B illustrate a birefringent prism interferometer based on a single birefringent prism pair.

FIG. 1C illustrates a Rochon prism that can be used to produce an optical path difference in the disclosed examples instead of or in combination with Wollaston prisms.

FIGS. 5A-5B illustrate a birefringent prism interferometer (BPI) based on Nomarski prisms (NP). In the example of FIGS. 5A-5B, a fringe localization (FL) plane is compensated and coincident with a focal plane array (FPA).

FIG. 10 is a schematic diagram of a spatial heterodyne interferometer (SHI)/spectrometer that includes polarizing gratings (PGs).

FIG. 11 illustrates Optical Path Difference (OPD) of tilted wavefronts exiting the PGs of the apparatus of FIG. 10. Representative spectral components (red, green, and blue) are tilted by an amount that is linearly proportional to wavelength $\lambda$.

DETAILED DESCRIPTION

Figure 2A:
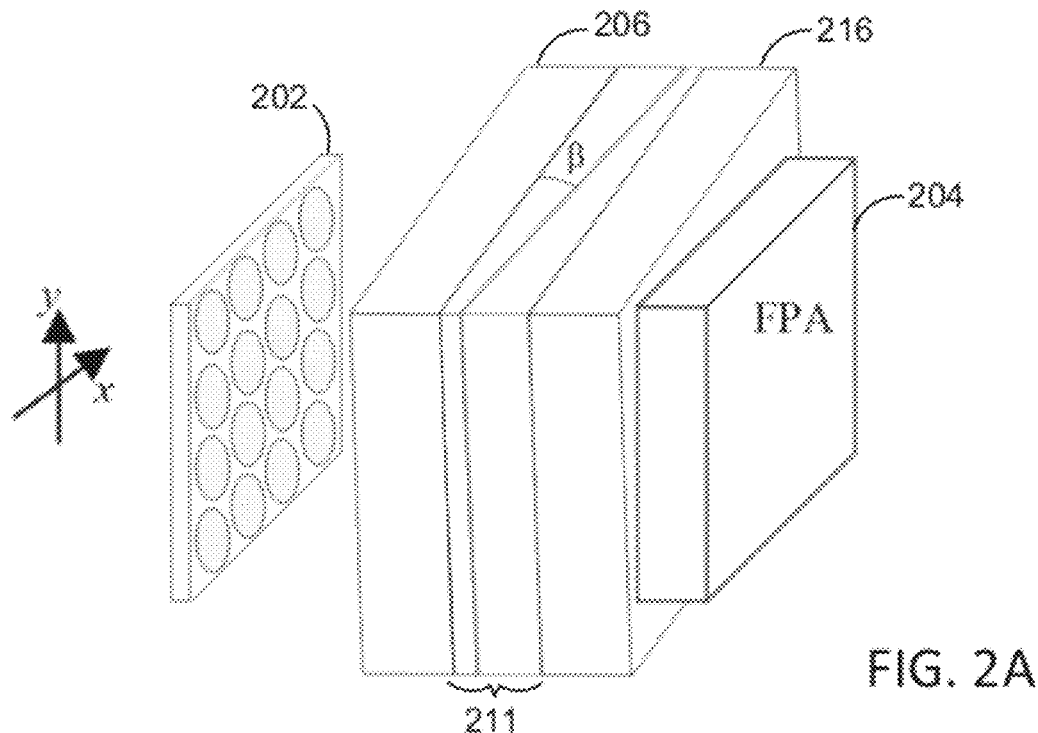
FIGS. 2A-2B illustrate a birefringence based snapshot imaging Fourier transform spectrometer that includes a birefringent prism pair and a lens array.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, the terms "light" and "optical radiation" refer to propagating electromagnetic radiation that is received from one or more objects to be imaged or otherwise investigated. As used herein, an optical flux refers to electromagnetic radiation in a wavelength range of from about 100 nm to about 100 µm. In some examples, an optical flux has a spectral width that can be as large as 0.5, 1, 2, 5, or 10 times a center wavelength, or can comprises a plurality of spectral components extending over similar spectral bandwidths. Such optical fluxes can be referred to as large bandwidth optical fluxes. A visible optical flux generally has a spectral bandwidth between about 400 nm and 700 nm. Typically, an optical flux is received from a scene of interest and amplitude, phase, spectral, or polarization modulation (or one or more combinations thereof) in the received optical flux is processed based on a detected image associated with a spatial variation of the optical flux which can be stored in one or more computer-readable media as an image file in a JPEG or other format. In the disclosed examples, so-called "snapshot" imaging systems are described in which image data associated with a plurality of regions or locations in a scene of interest (typically an entire two dimensional image) can be obtained in a single acquisition of a received optical flux using a two dimensional detector array. However, images can also be obtained using one dimensional arrays or one or more individual detectors and suitable scanning systems. In some examples, an image associated with the detected optical flux is stored for processing based on computer executable instruction stored in a computer readable medium and configured for execution on general purpose or special purpose processor, or dedicated processing hardware. In addition to snapshot imaging, sequential measurements can also be used. For convenience, examples that provide two dimensional images are described, but in other examples, one dimensional (line) images or single point images can be obtained.

For convenience, optical systems are described with respect to an axis along which optical fluxes propagate and along which optical components are situated. Such an axis can be shown as bent or folded by reflective optical elements. In the disclosed embodiments, an xyz-coordinate system is used in which a direction of propagation is along a z-axis (which may vary due to folding of the axis) and x- and y-axes define transverse planes. Typically the z-axis is in the plane of the drawings and defines a system optical axis. In other examples, lens arrays are used to produce a plurality of images of an object. In some examples, such images are referred to as sub-images and are associated with sub-image optical fluxes.

Example 1

With reference to FIGS. 1A-1B, an interferometer 100 includes a linear polarizer 102 situated along a z-axis of a xyz-coordinate system 104. The linear polarizer has an axis of polarization 106 oriented at an angle of 45 degrees with respect to an x-axis and a y-axis of the coordinate system 104. A birefringent prism pair 110 includes a first prism 112 and a second prism 114 having wedge angles β. As shown in FIG. 1, the first prism 112 has an optic axis 116 that is parallel to the y-axis and the second prism 114 has an optic axis 118 that is parallel to the x-axis. In typical examples, the prism pair 110 is a Wollaston prism made of calcite, quartz, or other suitable materials. While Wollaston prisms typically are formed of two right angle prisms (β=45 degrees), as used herein, the prism wedge angle β can have other values, and is typically between 1 and 40 degrees, 2 and 20 degrees or 5 and 15 degrees. A linear analyzer 120 is situated along the z-axis and is oriented an angle of 45 degrees with respect to the x-axis and the y-axis.

FIG. 1B also includes a schematic representation 140 of an optical path difference (OPD) produced by directing an optical beam through the interferometer 100. As shown in FIG. 1B, a y-polarization component is relatively delayed with respect to an x-polarization component by the prism 112 and the y-polarization component is relatively delayed with respect to the x-polarization component by the prism 114. The x- and y-polarization components are projected by the linear polarizer 120 onto a common axis so that the projected components can interfere.

Other birefringent prisms and prism pairs can be used to produce an optical path difference (OPD). For example, as shown in FIG. 1C, one or more Rochon prisms 180 can be used. The Rochon prism 180 includes a prism 182 of an isotropic material such as glass, and a birefringent prism 184 of a material such as calcite, crystal quartz, or other crystalline materials.

Example 2

Figure 2B:
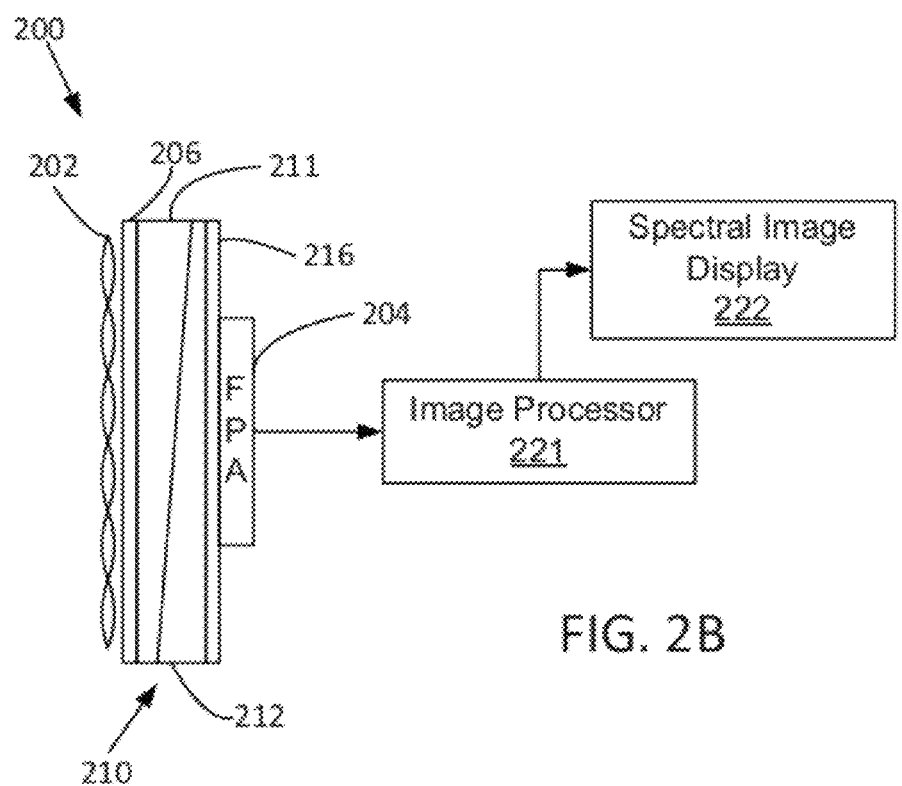

With reference to FIGS. 2A-2B, an imaging spectral interferometer 200 includes a lenslet array 202 that includes N by M lenses arranged in a rectangular array. The lenses of the array 202 form corresponding images of an object and direct the images to a focal plane array 204. The images are directed through a first polarizer 206, a birefringent prism pair 210, and a second polarizer 216. The first polarizer 206 and the second polarizer 216 are linear polarizers having transmission axes that are tilted with respect to an x-axis toward a positive y-axis by an angle of 45+δ degrees. In this example, the sub-images formed by the lenslet array 202 include a polarization based OPD that is a function of the x-coordinate due the varying thickness of wedge prisms 211, 212 and that can produce interference.

An image processor 221 is coupled to the FPA 204 to receive electrical signals associated with optical interference associated with the OPD produced by the prism pair 210. The electrical image signals associated with one or all of the lenslets of the array 202 can be recorded, and combined with other recorded signals. Typically, the recorded signals are processed to obtain an image so as to form an interference map as a function of OPD and then Fourier transformed at 221. A resulting spectral image is presented for visual inspection on a display 222, or stored or transmitted for further analysis. In this example, OPD is a function of x-coordinate, but additional prism pairs can be used to provide OPD variation along both x- and y-axes.

Example 3

Figure 3:
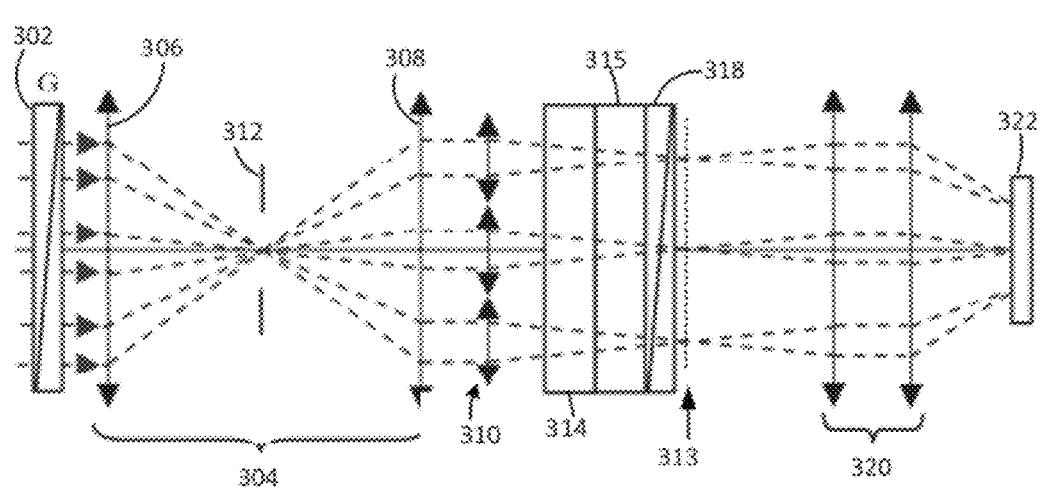
FIG. 3 illustrates a birefringence based snapshot imaging Fourier transform spectrometer that includes an afocal telescope and relay optics to image an intermediate image plane at a focal plane array.

With reference to FIG. 3, a representative snapshot imaging Fourier transform imager 300 includes a linear polarizer 302 situated to receive an optical flux from an object. A 1:1 afocal telescope 304 that includes an input lens 306 and an output lens 308 is situated to receive the optical flux from the polarizer 302 and deliver the optical flux to a lens array 310, such as a 10 by 10 array of lenses. A field stop 312 is situated at a focus of the input lens 306. Lenslets of the lens array 310 form respective images of the object and deliver the images to an intermediate image plane 313 through birefringent prism pairs 314, 315 and a linear polarization analyzer 318 that is re-imaged by relay optics 320 to a focal plane array 322. The prism pairs 314, 315 are situated to produce variable OPDs along orthogonal axes that are also orthogonal to a spectrometer axis 324.

In the example of FIG. 3, the afocal telescope 304 and the field stop 312 permit the images formed by the lenslets of the lens array 310 to be separated at the focal plane array 322. The relay optics 320 permit the image plane 313 of the lens array 310 to be re-imaged as needed. For a more compact instrument, the image plane 313 can be at the focal plane array 320, without relay optics. For convenient illustration, processing of the images detected by the focal plane array is not described in detail, but is based on Fourier transforms and the variable OPD provided by the prism pairs 314, 315.

Example 4

Figure 4:
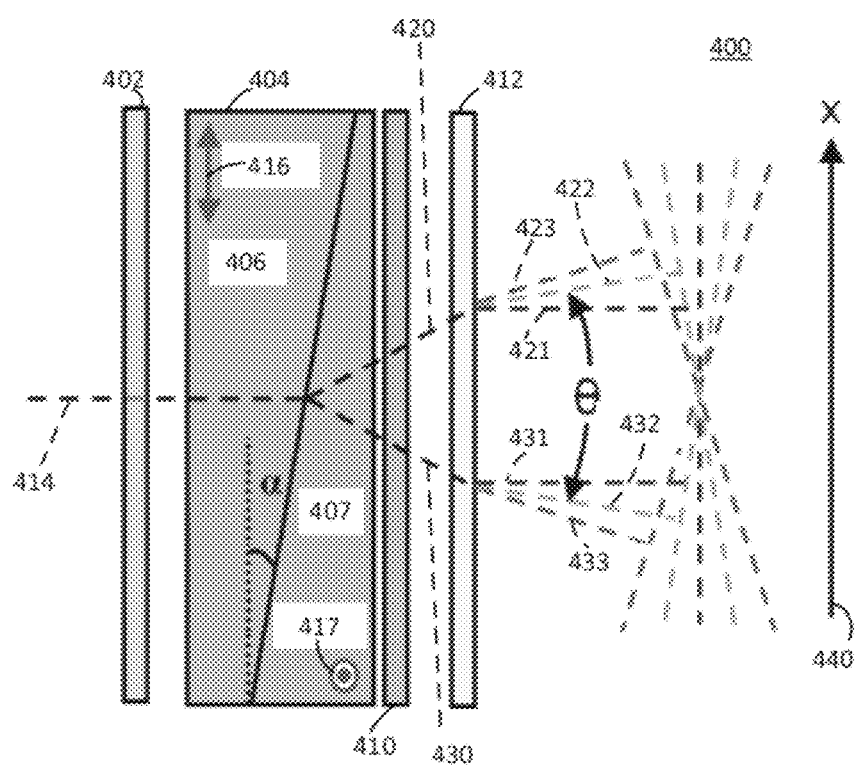
FIG. 4 is a schematic diagram of a representative Wollaston prism (WP) interference Fourier transform spectrometer (WIFTS) that includes a Wollaston prism.

With reference to FIG. 4, a polarizer/prism assembly 400 for a birefringence based snapshot interferometer includes a linear analyzer 402, a birefringent prism pair 404 having prisms 406, 407, a quarter wave retarder (QWP) 410 and a polarizing grating 412 situated along an axis 414. Other elements such as a lens array and a focal plane array or other image detectors are not shown. The prisms 406, 407 have optic axes 416, 417, respectively, that are mutually orthogonal and orthogonal to the axis 414. The polarizing grating 412 includes a liquid crystal arranged to diffract incident light into right and left circular polarization components. The QWP 410 is situated to produce circular states of polarization (SOPs) from the linear components produced by the birefringent prism pair 404. This enables the SOP exiting the birefringent prism pair 404 to interact with the eigenmodes of the polarization grating 412. Such polarizing gratings are described in, for example, Escuti et al., U.S. Patent Application Publication 20080278675, filed Nov. 13, 2008, which is incorporated herein by reference.

The assembly 400 results in an effective heterodyne shift in a Fourier transform of the interference intensity patterns. As shown in FIG. 4, F, d, and C wavelengths (486.1 nm, 587.5 nm, and 656.2 nm, respectively) are directed by the polarizing grating 412 along respective propagation directions 421, 422, 423 for a polarization component refracted along an axis 420, and F, d, and C wavelengths are directed by the polarizing grating 412 along respective propagation directions 431, 432, 433 for a polarization component refracted along an axis 430. The resulting OPD can be expressed as:

$$OPD = x\theta = x\left[2B\tan(\alpha) - \frac{2\lambda}{\Lambda}\right],$$

wherein $\alpha$ is a prism wedge angle, x is an x-coordinate along an x-axis 440, $\Lambda$ is a polarizing grating period, B is birefringence, and $\lambda$ is optical radiation wavelength. Optical intensity based on this OPD is given by:

$$I \propto \cos\left(\frac{2\pi OPD}{\lambda}\right) = \cos\left(\frac{4\pi \times B\tan(\alpha)}{\lambda} - \frac{4\pi x}{\Lambda}\right).$$

It is apparent from this expression that frequency components proportional to wavenumber ($1/\lambda$), are offset by a frequency (wavenumber) that is proportional to $1/\Lambda$.

Example 5

FIGS. 5A-5B illustrate a representative Snapshot Hyperspectral Imaging Fourier Transform (SHIFT) spectrometer 500 that includes Nomarski prisms. As shown in FIGS. 5A-5B, the SHIFT spectrometer 500 includes an N by M lens array 501 that is situated to direct an imaging light flux from an object 503 to a linear polarizer 502 that is configured to provide a polarized light flux to a first Nomarski prism 504, a half wave retarder 506, a second Nomarksi prism 508, and a linear polarization analyzer 510 as situated along a z-axis of a coordinate system 512. Each of the Nomarski prisms 504, 508 comprises two orthogonally oriented birefringent crystal prisms. One of the fast axes in each Nomarski prism is tilted with respect to a y-axis by an angle $\beta$ so as to define a real fringe localization (FL) plane 514 that is exterior to the second Nomarksi prism 508. The half wave retarder 506 is situated between the Nomarski prism 504, 508 and oriented at 45° so as to effectively provide a 90° rotation of the polarization eigenmodes of the Nomarski prism 508. In this way, the polarization eigenmodes of the Nomarski prism 504, 508 are effectively orthogonal, and the FL plane 514 is compensated so as to be parallel to the xy plane and can be made coincident with a detection plane of a focal plane array (FPA) 516. The polarizers 502, 510, the prisms 504, 508, and the retarder 506 form a birefringent prism interferometer (BPI) that can produce interference fringes.

In operation, an input light flux from an object or scene of interest is polarized by the polarizer 502 and interference fringes are generated along the FL 514 plane by the linear polarization analyzer 510, both of which are oriented at 45° with respect to the Nomarski prism eigenmodes. As a result, a compact structure can be provided that produces a linearly varying OPD between the two orthogonal polarization states as a function of x-coordinate. Using a prism apex (or wedge) angle $\alpha$, the OPD of a single Nomarski prism can be expressed as, for small angles $\alpha$:

$$OPD = 2Bx\tan(\alpha),$$

wherein B is the birefringence of the crystal, defined as a difference between extraordinary ($n_e$) and ordinary ($n_o$) indices of refraction, i.e., $B=(n_e-n_o)$ and $\alpha$ is the wedge angle. Placing the BPI directly onto an FPA thus creates an OPD as a function of FPA pixel position. A rotation of this OPD is obtained by rotating the prisms, waveplate, and polarizers by a small angle $\delta$ with respect to the FPA, as illustrated in FIG. 5B. The lenslet array 501 produces sub-images of the object 503 that are imaged through the BPI and onto the FPA 516.

Figure 6B:
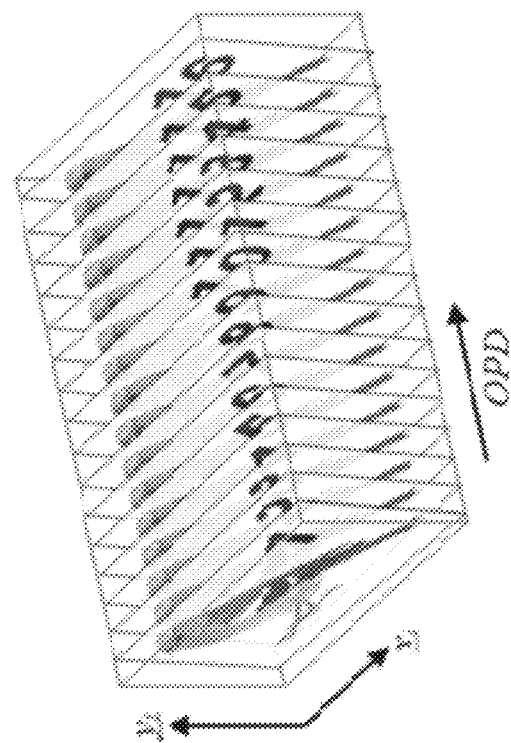
FIG. 6B illustrates construction of a 3D data cube with dimensions ($x_j$, $y_j$, OPD) from sampled sub-images.
Figure 6A:
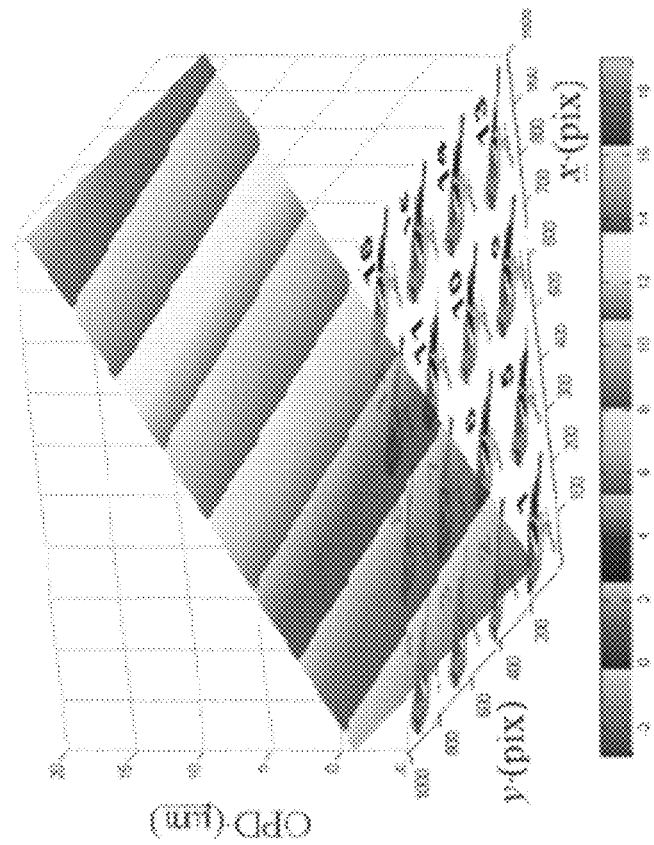
FIG. 6A is a graph of OPD (µm) as a function of sub-image location in pixels (pix) on a focal plane array.

N×M sub-images are formed coincident with both the FPA 516 and the FL plane 514, wherein N, M are numbers of lenslets along y and x, respectively. An example of OPD versus spatial position, relative to each sub-image, is depicted in FIG. 6A. Notable is the large slope in OPD along x, produced predominantly by the wedge angle $\alpha$, and the relatively small slope along y, which is produced by a small rotation $\delta$. The angle $\delta$ can be calculated by $$\delta = \tan^{-1}(1/M). \quad (1)$$

This small rotation enables each sub-image to be based on sequentially larger values of OPD. To emphasize this, the sub-images in FIG. 6A are numbered 1-16, with images 1 and 16 representing the most negative and positive OPD samples, respectively. Consequently, each sub-image corresponds to a different "slice" of a 3D interferogram cube, as depicted in FIG. 6B which has dimensions ($x_i$, $y_i$, OPD), wherein $x_i$ and $y_i$ are spatial coordinates within sub-images. Thus, an interferogram and its corresponding spectrum can be calculated at each spatial location within the scene. Performing the post-processing calculations produces the datacube ($x_i$, $y_i$, $\lambda$).

Example 6

Figure 7:
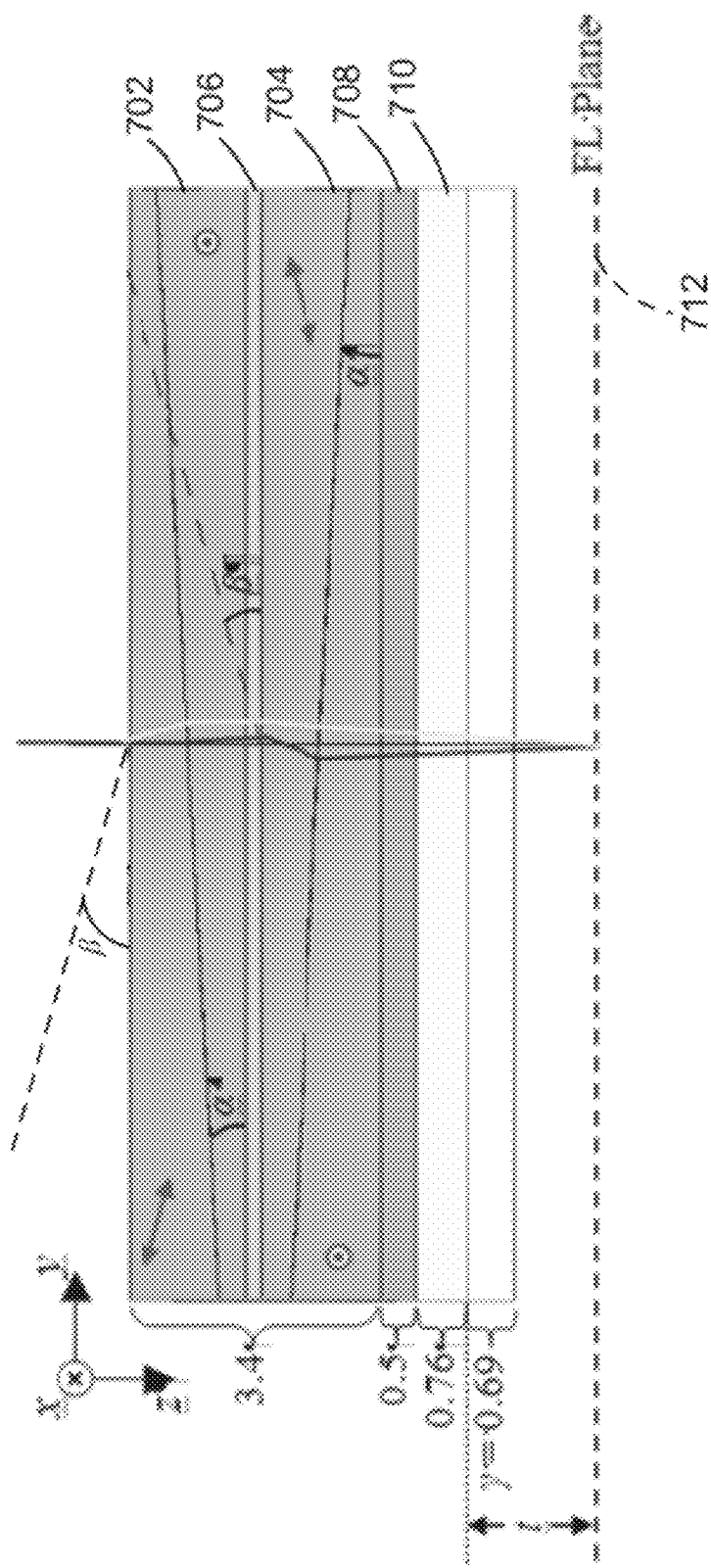
FIG. 7 is a sectional view of a representative birefringent interferometer. Dimensions are in mm, $\alpha=3.15°$, and $\beta=16.2°$.

For spatially and spectrally incoherent illumination, the FL plane of a Nomarski prism is located where the extraordinary (e) and ordinary (o) rays intersect. A representative interferometer configuration is depicted in FIG. 7, without a lenslet array. Quartz Nomarski prisms 702, 704, a half wave retarder 706, a linear analyzer 708, and a focal plane array cover glass 710 are arranged in a stack. For the example of FIG. 7, the cover glass is assumed to be BK-7 glass and a rear vertex distance to an FPA is $\gamma=0.69$ mm based on typical values. Relocalizing a FL plane 712 can be achieved by tilting the fast axes of one prism, within both NPs, by an angle $\beta$ with respect to the y axis. A wedge angle $\alpha$ can be selected to produce an intended OPD as discussed above.

Example 7

Figure 8:
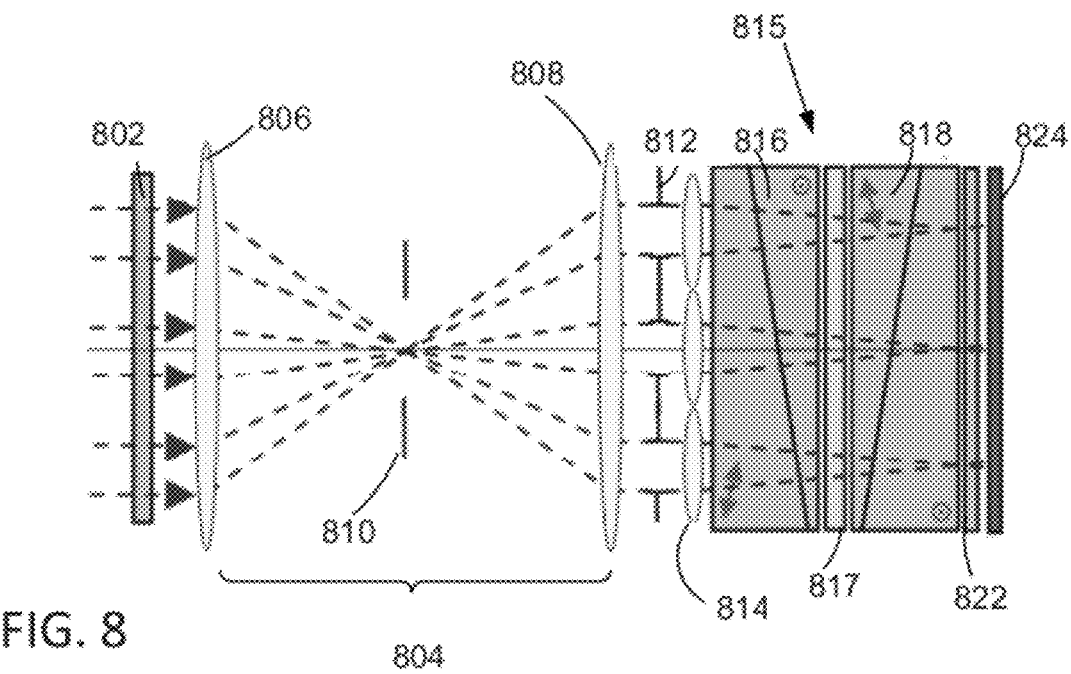
FIG. 8 is a schematic diagram of a representative implementation of a SHIFT sensor.

With reference to FIG. 8, a representative SHIFT sensor 800 includes an input polarizer (or polarization generator) 802 that directs a polarized optical flux to a relay optical system 804 that includes an objective lens 806 and a collimating lens 808. The lenses 804, 806 have focal lengths of 50 mm focal length and focal ratios of 1.8. The generating polarizer is a wire-grid polarizer in this example, but other types can be used. A field stop/diffuser 810 is situated a common focus of the lenses 806, 808. The diffuser can be a 1500 grit ground glass diffuser and serves to artificially flatten the scene, to reduce object-dependent image registration errors due to parallax. A 10 by 10 aperture array 812 and a 10 by 10 fused silica lens array 814 are situated to receive the optical flux from the relay optical system 804 and produce sub-images that are transmitted through a BPI 815 that includes quartz Nomarski prisms 816, 818 having angles $\alpha=3.15$ degrees and $\beta=16.2$ degrees, and rotated by an angle $\delta=6.3$ degrees. The lenslets of the array 814 are symmetric plano-convex lenses with radii of curvature of 2.4 mm, but are shown as biconvex lenses for clarity. A polymer achromatic half wave plate (HWP) 817 is situated between the prisms 816, 818 and has a retardance variation of ±0.008 waves over 420-680 nm. An analyzer 822 is situated at an output of the BPI 815, and sub-images produced by the lens array 814 are formed on a focal plane array (FPA) 824.

Example 8

Figure 9:
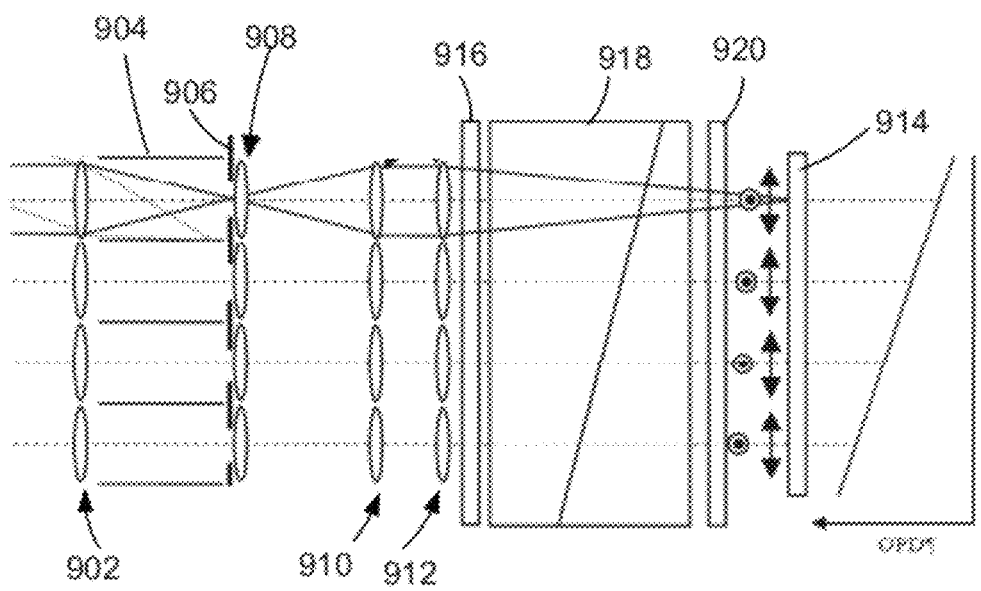
FIG. 9 is a schematic diagram of an additional example of a FPA-mounted SHIFT sensor based on a Wollaston prism using three extra lenslet arrays, a field-stop array, and a baffle array.

It is generally convenient to limiting the field of view of each lenslet in a lens array so that adjacent sub-images do not overlap or multiplex. An afocal telescope and a baffle stop array can be provided to control field of view. A representative example is illustrated in FIG. 9. An objective lens array 902 delivers optical flux from a scene of interest through a baffle array 904 to a field stop array 906 and a field lens array 908. A collimator array 910 and a re-imaging array 912 direct images to a focal plane array 914 through a generating polarizer 916, a Wollaston prism 918, and an analyzer 920 that are configured to produce interference. The baffle array controls stray light and can limit the field-of-view to a predetermined angular range such as +/−5°. The field lens array 908 is used to control vignetting at the collimating lens array 912.

Example 9

Spatial heterodyning in a birefringent interferometer and a SHIFT spectrometer can also be provided. One limitation of Fourier transform spectroscopy, as compared to a diffraction grating spectrometer, is that not all optical frequencies sampled by the interferometer are measured by the light detector. If the detector is only responsive between wavenumbers $\sigma=\sigma_{min}$ and $\sigma=\sigma_{max}$, then any spectral samples present spanning $0<\sigma<\sigma_{min}$, and $\sigma>\sigma_{max}$ are effectively wasted after the detected intensity undergoes Fourier transformation. This typically means that only 25-50% of an interferogram's samples correspond to usable data. In addition, unlike a conventional diffraction-grating spectrometer, samples cannot generally be aligned to specific spectral frequencies. Conversely, in a traditional FTS, the sampling locations are determined by the sampling and Nyquist frequencies. Consequently, specific spectral locations which may correspond to spectral features of interest cannot be sampled with high spectral resolution. These limitations can be at least partially overcome with Spatial Heterodyne Interferometry (SHI) in which a carrier frequency offset is added to the FTS carrier frequency.

By tilting at least one interferometer mirror, a conventional Michelson-based FTS can produce a fringe pattern corresponding to $$I \propto \int_0^{\sigma_{max}} B(\sigma)R(\sigma)[1+\cos(2\pi OPD(\sigma-\sigma_0))]d\sigma, \qquad (2)$$

wherein $\sigma_0$ is an offset, usually corresponding to $\sigma_0=\sigma_{min}$ such that 0 cycles/mm in an interferogram corresponds to $\sigma_{min}$. Note that this is converse to the non-heterodyned original case, wherein $\sigma=0$ corresponded to 0 cycles/mm in the interferogram. This enables the interferometer to sample only a selected spectral region of interest; in this case, minimum and maximum wavenumbers corresponding to the responsivity of the detector. Furthermore, it enables a large frequency variation in the interferogram (I) to occur given a small spectral change in the incident spectrum, enabling the potential of sub-angstrom spectral resolution over a small spectral range $\sigma_{min}$ to $\sigma_{max}$.

FIG. 10 illustrates a SHI-based imaging spectral analyzer based on Wollaston prisms and polarizing gratings and can be made compact. In the example of FIG. 10, broadband achromatic fringes containing a single carrier frequency ($\sigma_0$), are generated by polarization grating 1002 (PG$_1$) and polarization grating 1004 (PG$_2$). These fringes are superimposed onto the broadband white-light fringes ($\sigma$) generated by Wollaston prism 1006 (WP$_1$) and localized inside WP$_1$. A Wollaston prism 1008 (WP$_2$) then re-localizes the fringes onto a focal plane array 1010 (FPA). A generating linear polarizer 1012 (LPG) is used to place incident illumination into a coherent polarization state, while an analyzing linear polarizer 1014 (LPA) is used to enable the orthogonal polarization states exiting the system to interfere. A quarter-wave plate 1016 (QWP) is used to convert the right and left circular polarization states exiting the two PGs into the Wollaston prism eigenstates; specifically, right and left circular polarizations are converted into horizontal and vertical (or vice versa) polarization states.

The interference, generated by the PGs 1002, 1004 can be described by a tilt in the wavefronts exiting PG$_1$ and PG$_2$. This can be calculated by the grating equation:

$$\theta = \sin^{-1}\frac{m\lambda}{\Lambda} \approx \frac{m\lambda}{\Lambda}, \qquad (3)$$

wherein $\Lambda$ is a grating period, $\lambda$ is a free-space wavelength of incident illumination, and m is a diffraction order. For a typical PG, m=0 and +/−1.

An illustration of tilted wavefronts exiting the two PGs 1002, 1004 is depicted in FIG. 11. The OPD between the two orthogonally polarized wavefronts can be calculated using the grating equation (Eq. 3) by first calculating the angle of a ray exiting PG$_2$ as:

$$\theta_o \approx \lambda\left(\frac{\Lambda_2-\Lambda_1}{\Lambda_1\Lambda_2}\right), \qquad (4)$$

wherein $\Lambda_1$, $\Lambda_2$ are periods of the gratings 1002, 1004, respectively. The OPD between two tilted wavefronts can be calculated, at a given x coordinate, as:

$$OPD_{pg} = 2x\lambda\left(\frac{\Lambda_2-\Lambda_1}{\Lambda_1\Lambda_2}\right). \qquad (5)$$

The interference fringes that are generated at the fringe localization plane are $$I \propto 1 + \cos\left(\frac{2\pi OPD}{\lambda}\right) = 1 + \cos\left(4\pi x\left(\frac{\Lambda_2 - \Lambda_1}{\Lambda_1 \Lambda_2}\right)\right). \quad (6)$$

Note that the intensity pattern fringe frequency is only proportional to the periods of the two polarizing gratings. Due to the diffractive nature of the polarization gratings, the direct proportionality to wavelength λ in OPD as shown in Eq. 5, cancels with the inverse wavelength proportionality of the interference fringes from the left hand side of Eq. 6.

The effects of the Wollaston prism $WP_1$ on the OPD are determined. Unlike polarization gratings, a Wollaston prism will not generate a wavefront tilt that is linearly proportional to the wavelength. Conversely, sans a minor amount of high-order dispersion from the birefringent material, a Wollaston prism generates a tilt that is essentially achromatic versus wavelength. For a Wollaston prism, the OPD can be calculated as:

$$\theta_{w1} \approx 2B\tan(\alpha_1). \quad (7)$$

The OPD can again be established by calculating the distance between the two orthogonally polarized wavefronts as:

$$OPD_{w1} = 2Bx\tan(\alpha_1). \quad (8)$$

wherein B is the birefringence of the crystal material (B=$n_e$−$n_o$) and $n_e$, $n_o$ are the extraordinary and ordinary indices of refraction, respectively. By imaging the achromatic interference fringes directly into $WP_1$, the two optical path differences are combined; one dispersive (from the polarizing gratings), and the other achromatic (from the Wollaston prism). The cumulative optical path difference between the two orthogonally polarized beams becomes:

$$OPD_{pg} + OPD_{w1} = 2x\left(B\tan(\alpha_1) + \lambda\left(\frac{\Lambda_2 - \Lambda_1}{\Lambda_1 \Lambda_2}\right)\right). \quad (9)$$

This creates a cumulative interference pattern as follows:

$$I \propto 1 + \cos\left(4\pi x\left(\frac{B\tan(\alpha_1)}{\lambda} + \left(\frac{\Lambda_2 - \Lambda_1}{\Lambda_1 \Lambda_2}\right)\right)\right). \quad (10)$$

The carrier frequency (U) of the interferogram is a combination of wavelength dependent and wavelength independent components:

$$U = U_1(\lambda) + U_2, \quad (11)$$

wherein $$U_1 = \frac{2B\tan(\alpha_1)}{\lambda}, \quad (12)$$

$$U_2 = \left(\frac{\Lambda_2 - \Lambda_1}{\Lambda_1 \Lambda_2}\right). \quad (13)$$

Here, $U_2$ is equivalent to $\sigma_0$ per Eq. 2 above. Consequently, a spatially heterodyned fringe field is located within $WP_1$. Transmission through the second Wollaston prism ($WP_2$) re-localizes this spatially heterodyned fringe field onto the FPA 1010. $WP_2$ also influences the OPD further; however, assuming it is made of the same material as $WP_1$, it only directly modifies the dispersion-related term of the OPD. The OPD of $WP_2$ can be expressed as:

$$OPD_{w2} = -2Bx\tan(\alpha_2). \quad (14)$$

wherein the OPD is negative due to the inverse direction of the shear for $WP_2$ with respect to $WP_1$. This makes the cumulative OPD at the FPA proportional to:

$$OPD_{pg} + OPD_{w1} + OPD_{w2} \propto 2x\left(B\tan(\alpha_1) - B\tan(\alpha_2) + \lambda\left(\frac{\Lambda_2 - \Lambda_1}{\Lambda_1 \Lambda_2}\right)\right). \quad (15)$$

Thus, the carrier frequency components are:

$$U_1 = 2B\sigma(\tan(\alpha_1) - \tan(\alpha_2)), \quad (16)$$

$$U_2 = \left(\frac{\Lambda_2 - \Lambda_1}{\Lambda_1 \Lambda_2}\right). \quad (17)$$

Consequently, an SHI interferometer, and by extension, high-resolution spectra over a narrow passband, can be obtained with a polarization-based instrument such as illustrated in FIG. 10.

Example 10

Figure 12:
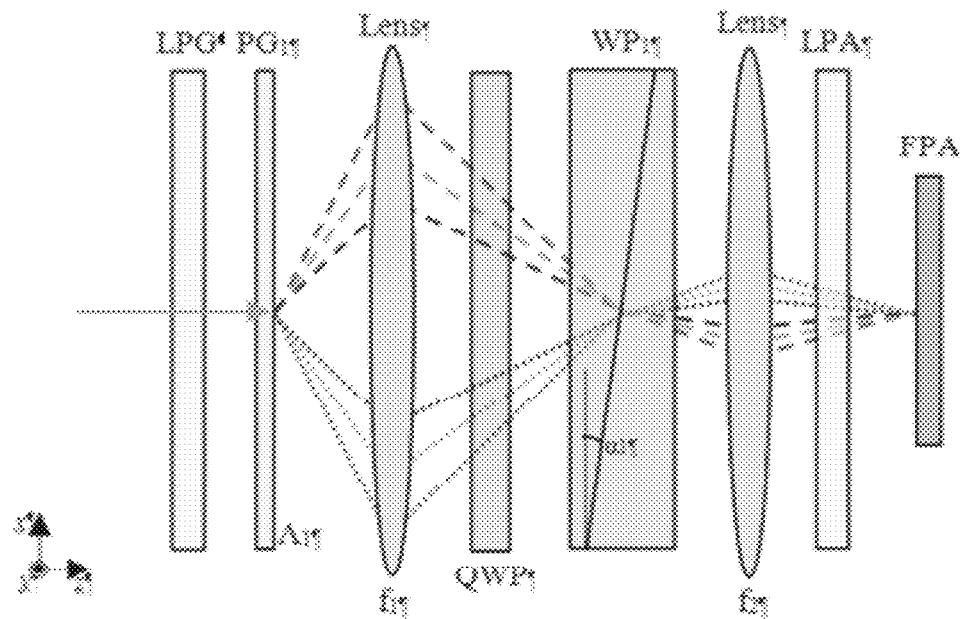
FIG. 12 is a schematic diagram of an alternative embodiment in which fringes are re-localized using lenses instead of a polarizing grating and a Wollaston prism.
Figure 13:
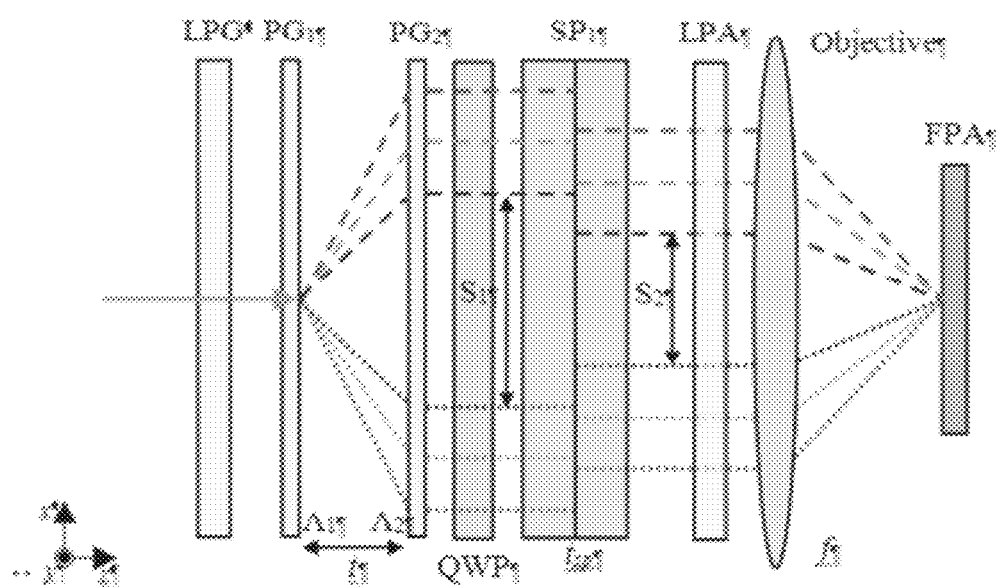
FIG. 13 is a schematic diagram of an alternative embodiment in which fringes are localized at infinity and collimated illumination is used through polarization gratings and a Savart plate.

FIG. 12 illustrates another embodiment in which relay lenses transfer interference fringes from one plane to a following plane. This embodiment is similar to that of FIG. 10 with $PG_2$ and $WP_2$ replaced with relay lenses. In this alternative, the interference fringes generated by $PG_1$ are re-localized onto $WP_1$ using a lens with focal length $f_1$ and an additional polarizing grating is unnecessary. Similarly, the interference fringes located within $WP_1$ are relayed onto the FPA with a lens of focal length $f_2$. This lens substitutes for the second Wollaston prism $WP_2$ of FIG. 10. In other examples, the FPA could be situated directly behind $WP_1$. However, since the fringes are technically localized at the wedge of $WP_2$, fringe visibility may be diminished in such a configuration. Furthermore, two PGs and one lens could be used instead of an additional Wollaston prism, or alternatively, one polarizing grating and one lens with two Wollaston prisms could be used instead of an additional polarizing grating.

Example 11

The embodiments described above generally use image-plane interferometers to generate SHI fringes. However, polarization components can also be used within the pupil of an optical system, such that all the interference fringes are localized at infinity. This can be beneficial, since the SHI would have collimated light transmitted through it, rather than converging light. Such factors can influence fringe visibility, or alternatively, can influence the minimum F/# (or speed) at which the interferometer can be operated. Typically, image plane interferometers (such as those of FIG. 10, 12) have more difficulty with low F/# systems than do pupil interferometers.

A representative pupil interferometer configuration with two polarizing gratings and one Savart plate (SP) is illustrated in FIG. 12. In this embodiment, the two polarization gratings are used as in FIGS. 10, 11. Interference fringes from $PG_1$ and $PG_2$ are localized at infinity be setting the two PG periods to be equal ($\Lambda = \Lambda_1 = \Lambda_2$). This can produce white-light polarization interference fringes. The two PGs produce a shear ($S_1$) that is linearly proportional to the wavelength:

$$S_1 \approx 2\frac{\lambda}{\Lambda}t. \tag{18}$$

wherein t is the distance between $PG_1$ and $PG_2$. Transmission of the two orthogonally circularly polarized beams through the QWP converts them to orthogonally polarized linear beams.

After transmission through the QWP, the beams are incident upon a Savart Plate (SP). Similarly to the Wollaston prisms in other examples, the SP creates, to first order, an achromatic shear that is independent of the wavelength. The shear of the SP can be expressed as $$S_{SP} = \sqrt{2}\frac{n_e^2 - n_o^2}{n_e^2 + n_o^2}t_{sp}, . \tag{19}$$

wherein $t_{sp}$ is the thickness of the SP and $n_e$, $n_o$ are the extraordinary and ordinary indices of refraction, respectively. Consequently, transmission of the sheared beams, from the PGs, through the SP creates a constant offset. This creates a second shear $S_2$, that can be calculated as $S_1 - S_{SP}$:

$$S_2 = \left(2\frac{\lambda}{\Lambda}t - \sqrt{2}\frac{n_e^2 - n_o^2}{n_e^2 + n_o^2}t_{sp}\right). \tag{20}$$

One term is linearly proportional to wavelength and another term that is essentially achromatic. In this system, an OPD is created after transmission through the objective lens. The OPD is:

$$OPD = S_{shear} \sin(\theta) \approx S_{shear}\theta, \tag{21}$$

wherein $S_{shear}$ is the shear generated by the combination of the PGs and SP (shear $S_2$). Here, $\theta$ is proportional to the focal length of the objective lens (f), and the image-plane coordinate (x), such that $\theta = x/f$ The intensity pattern on the FPA is then proportional to:

$$I \propto 1 + \cos\left(\frac{2\pi x}{f}\left(\frac{2t}{\Lambda} - \frac{\sqrt{2}}{\lambda}\frac{n_e^2 - n_o^2}{n_e^2 + n_o^2}t_{sp}\right)\right). \tag{22}$$

This can be decomposed into a wavelength dependent and wavelength independent part as:

$$U = U_1(\lambda) + U_2, \tag{23}$$

wherein $$U_1 = -\frac{\sqrt{2}}{\lambda f}\frac{n_e^2 - n_o^2}{n_e^2 + n_o^2}t_{sp}, \tag{24}$$

$$U_2 = \frac{2t}{\Lambda f}. \tag{25}$$

Again, $U_2$ is equivalent to a heterodyne offset similar to $\sigma_0$ of Eq. 2 above.

Example 12

Figure 14:
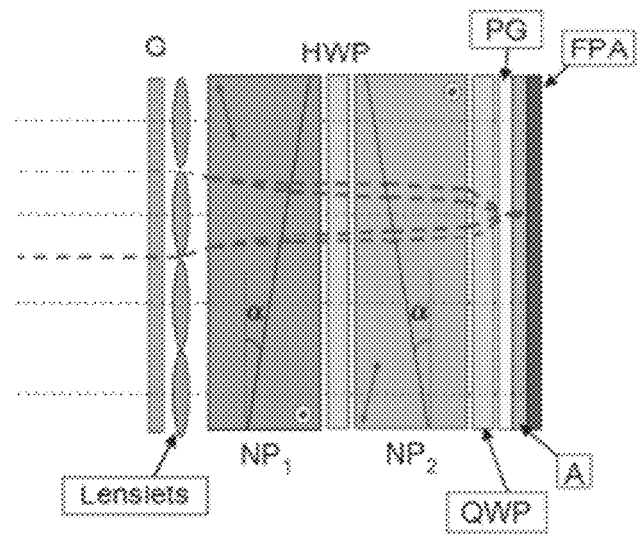
FIG. 14 is a schematic diagram of an imaging spatial heterodyne spectrometer.

In an example of a spatially heterodyned SHIFT spectrometer illustrated in FIG. 14, a plurality of Nomarski prisms (NP) or Wollaston prisms (WP), linear polarizers (LPs), polarization gratings (PG), and waveplates (QWP or HWP) are situated along an axis. Generally, the waveplates are used to rotate the eigenmodes of the polarization states between the different components. A PG is then used to spatially heterodyne the interference fringes from the two NPs. A lenslet array is included to create an array of sub-images onto an FPA. Generally, the interference fringes can be optically relayed between any of the fringe localization planes using lenses, or by use of a combination of birefringent optical elements.

Example 13

Figure 15:
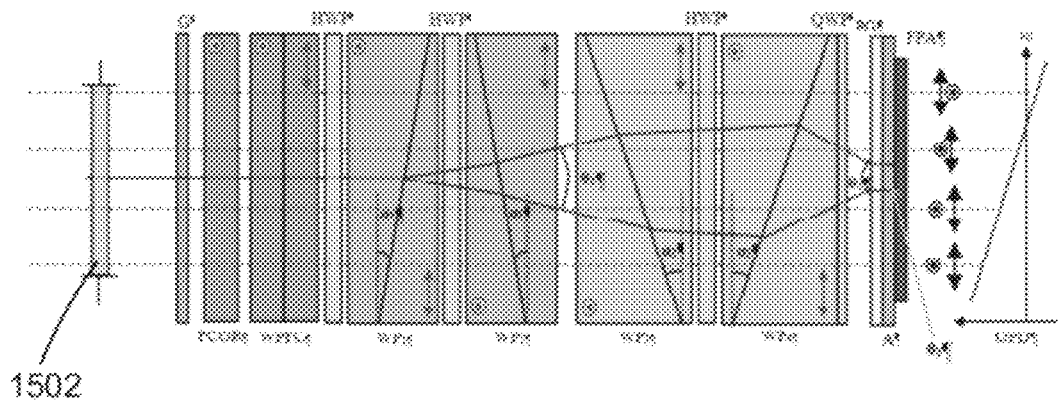
FIG. 15 is a schematic diagram of a non-imaging spatial heterodyne spectrometer (SHS) device.

With reference to FIG. 15, a field widened birefringent SHS is depicted. A depolarizer 1502 is coincident with an input aperture, and can reduce instrumental dependence on incident polarization state. Depolarized light is then converted into a 45° linear polarization state by a generating polarizer (G). Light is then transmitted through a field compensated offset retarder (FCOR), which delays the relative phase of the two orthogonal components. This is equivalent to setting a retardance offset by making the two pathlengths in a Michelson-SHS different (i.e. $d_1 \neq d_2$). A Wollaston prism field compensator (WPFC) compensates the optical path difference (OPD) versus field of view (FOV) of the interferometer (i.e. field-widening), thereby increasing the system's overall ètendue. Light then reaches the first pair of identical, but orthogonally oriented, Wollaston prisms $WP_1$ and $WP_2$.

Inserting a half wave plate (HWP) between $WP_1$ and $WP_2$ doubles the splitting angle, instead of negating it, with respect to that of a single Wollaston prism (WP). This orientation of prism pairs also maintains optical path difference symmetry between the prisms, enabling the fringes to remain localized within a plane normal to the optical axis, instead of at the wedge. Such a combination of $WP_1$ and $WP_2$ is referred to herein as fringe localization compensated (FLC) prisms. The angle between the two orthogonally polarized beams exiting the first ($WP_1$ and $WP_2$) and second ($WP_3$ and $WP_4$) WP pair is $$\theta_2 = 4B(\tan(\alpha_1) - \tan(\alpha_2)), \tag{26}$$

wherein $B = (n_e - n_o)$ is the birefringence of the uniaxial crystal, $n_o$ and $n_e$ are the ordinary and extraordinary indices of refraction, respectively, and $\alpha_1$ and $\alpha_2$ are the prism apex angles for the first and second WP pairs, respectively. Since $|\alpha_2| > |\alpha_1|$, light transmitted by $WP_3$ and $WP_4$ now converges towards the optical axis into a non-virtual (real) fringe localization plane. In order to induce a spatial heterodyning wavelength, a polarization grating (PG) is inserted. In a PG, right and left circularly polarized light diffracts into the $+1^{st}$ or $-1^{st}$ diffraction order according to the classical grating equation:

$$\theta_{PG} \approx \frac{m\lambda}{\Lambda}, \tag{27}$$

wherein m is a diffraction order, $\lambda$ is the free-space wavelength, and $\Lambda$ is the period of the PG. Since the eigenpolarizations of the PG are circular, a quarter-wave plate (QWP) is included at the output of $WP_4$ so that the linearly polarized light exiting $WP_4$ is converted into circularly polarized light.

Upon exiting the PG, the total angle between the two orthogonally polarized beams, to first order, is:

$$\theta_3 = 4B(\tan(\alpha_1) - \tan(\alpha_2)) + \frac{2\lambda}{\Lambda}. \qquad (28)$$

Transmission through the analyzing polarizer (A) unifies the polarization state, thereby enabling the two polarized beams to generate interference fringes that are measured by the focal plane array (FPA). The optical path difference can be calculated by multiplying Eq. (28) by the spatial coordinate of the FPA, x, and by including the retardance of the FCOR as:

$$OPD = x\left[4B(\tan(\alpha_1) - \tan(\alpha_2)) + \frac{2\lambda}{\Lambda}\right] + \Delta_{FCOR}. \qquad (29)$$

Substitution of the OPD into the standard two-beam interference equation produces the interferogram:

$$I \propto \int_0^\infty K(\sigma)R(\sigma)\left[1 + \cos\left(2\pi x\left[4B(\tan(\alpha_1) - \tan(\alpha_2))\sigma + \frac{2}{\Lambda}\right] + 2\pi\Delta_{FCOR}\right)\right]d\sigma. \qquad (30)$$

From Eq. (30), the heterodyne offset $\sigma_0$ is $$\sigma_0 = \frac{2}{\Lambda}. \qquad (31)$$

The heterodyne wavelength can be calculated by setting the term inside the square brackets, per Eq. (30), equal to zero. Solving for $\lambda_0(\sigma=1/\lambda_0)$ yields $$\lambda_0 = -2B\Lambda(\tan(\alpha_1) - \tan(\alpha_2)). \qquad (32)$$

Therefore, by combining a Wollaston prism-based Fourier transform spectrometer with a polarization grating, a spatially heterodyned interferogram can be generated. This provides an added advantage in that objective lenses are not necessary to re-localize a virtual fringe field onto the FPA, as is the case with reflective SHS instruments.

Example 14

Figure 16:
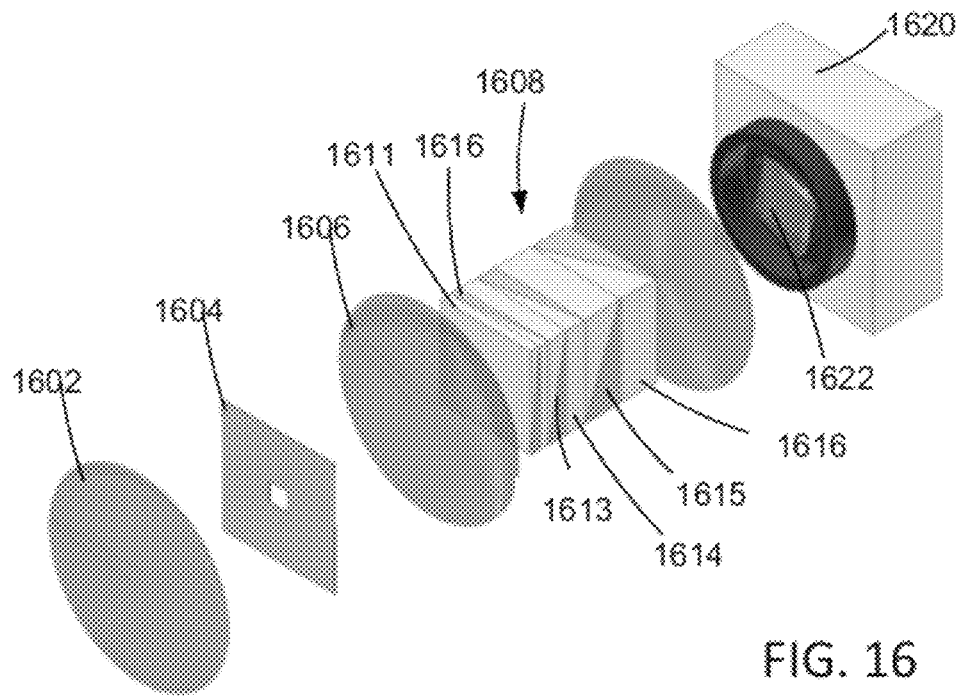
FIG. 16 is a schematic diagram of a representative Wollaston prism (WP) interference Fourier transform spectrometer (WIFTS) that includes a series of 6 Wollaston prisms to produce an 8 by 8 array of sub-images at a focal plane array (FPA).

With reference to FIG. 16, a primary lens 1602 is situated to produce an image of a scene or object at a field stop 1604. A first re-imaging lens 1606 collimates the image and directs the collimated image to a WP stack 1608 that comprises WPs 1611-1616. The WPs 1611, 1613, 1615 are defined by wedge angles along a first axis, and WPs 1612, 1614, 1616 are defined by wedge angles along a second axis that is perpendicular to the first axis. In order to provide a proper polarization state into the Wollaston series, a polarizer at 45° is inserted in just behind the first re-imaging lens but is not shown in FIG. 16. The Wollaston series is then able to split the 'single beam' of the field stop into 64 beams, which then creates 64 (8×8) copies of the image in the field stop onto a FPA 1620. A rotated Wollaston prism with an analyzer 1622 is situated just prior to the FPA 1620. When the 8×8 array of images is imaged onto this rotated Wollaston, reconstruction of a 3D data cube of interferograms and spectra can then be accomplished. Therefore, such an arrangement has the advantages of high temporal registration (snapshot) with a common path interference system. Additionally, any complex imaging system can be used with this instrument (such as a large astronomical telescope, or other sophisticated imaging lens or mirror systems).

In the example of FIG. 15, 6 Wollaston prisms are used to obtain 64 images in an 8×8 array, but more or fewer Wollaston prisms can be used and these can be arranged differently. If N is a total number of Wollaston prism used to produce sub-images along a particular axis, then a number of images created by these prisms is $2^N$. For example, as shown in FIG. 1, the number of sub-images in each of the x and y directions is $2^3$ (N=3). If N=7 Wollaston prisms were arranged to produced images along a single axis, 27=128 sub-images in a 1 by 128 array. These N=7 Wollaston prisms can also be arranged to produce sub-images along different axes. For example, N=3 WPs and N=4 WPs can be arranged to produced sub-images along an x and a y axis, respectively, to produce 128 sub-images in an 8×16 array. N=8 Wollaston prisms can be used to form 256 sub-images in a 16×16 array.

Example 15

Figure 17:
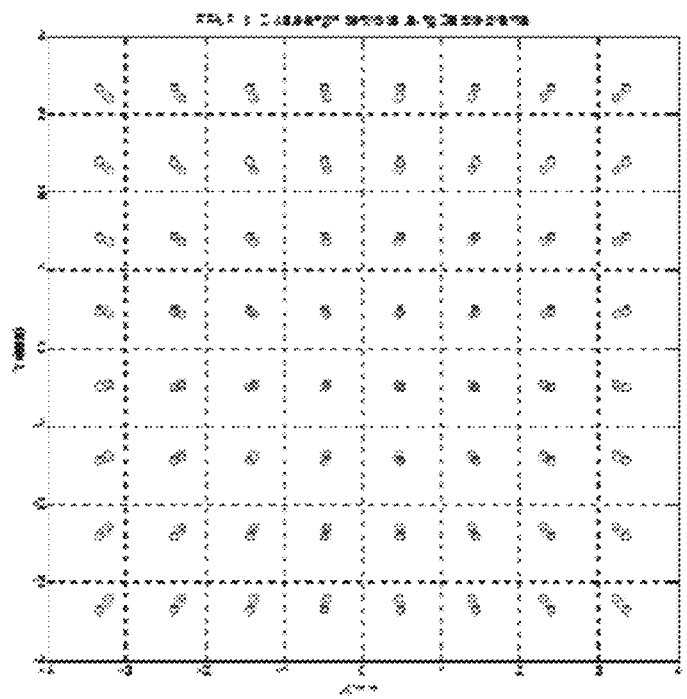
FIG. 17 illustrates calculated dispersion effects associated with calcite Wollaston prisms. Centroids for F (486.1 nm), d (587.5 nm), and C (656.2 nm) wavelengths are shown for each of the sub-images of an 8 by 8 array.

Wollaston prisms formed of calcite are dispersive, and any array of sub-images will generally exhibit image displacements that are function of wavelength. For the representative series of N=6 calcite WPs illustrated in FIG. 15 above, F, d, and C wavelength centroids (486.1 nm, 587.5 nm, and 656.2 nm, respectively) at the FPA and a sample image would appear as shown in FIG. 17. C wavelength centroids are the innermost, and F wavelength centroids are the outermost. Interference effects due to the last Wollaston prism at the FPA are not included. As can be seen from FIG. 17, the amount of dispersion to obtain the required image split is high, especially for the images towards the corner of the FPA. An excellent achromatic Wollaston prism can be made by combining Calcite and Yttrium Vanadate ($YVO_4$). In fact, the partial dispersion ratios of these two materials are nearly identical. Since the secondary dispersion is dependent upon the difference of the partial dispersion ratios, this means that this not only creates an achromatic prism, but it is roughly apochromatic.

Example 16

Figure 18:
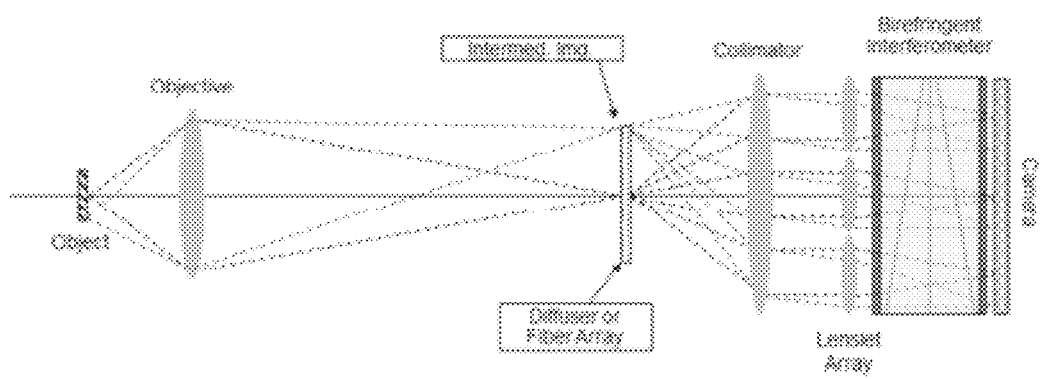
FIG. 18 illustrates a birefringent interferometer coupled to a microscope.
Figure 19:
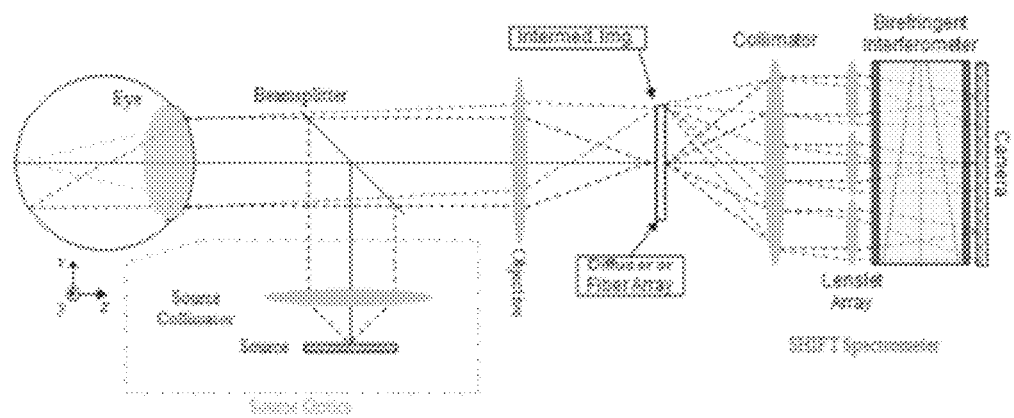
FIG. 19 illustrates a Snapshot Hyperspectral Imaging Fourier Transform (SHIFT) sensor configured for retinal imaging.

FIGS. 18-19 illustrate representative applications of SHIFT sensors. FIG. 18 illustrates use with a microscope, and FIG. 19 illustrates retinal imaging with a fundus camera. In some applications, a diffuser is positioned to avoid parallax. The disclosed systems can be used in a variety of other applications.

In view of the many possible embodiments to which the principles of the disclosed technology may be applied, it should be recognized that the illustrated embodiments are only preferred examples and should not be taken as limiting in scope. I claim as my invention all that comes within the scope and spirit of the appended claims.

I claim:

1. An interferometer, comprising, from object-wise to image-wise along an axis:
   a lens array that produces a plurality of sub-images of an object based on associated sub-image light fluxes;
   a polarizing grating situated to produce an interference pattern in the sub-image light fluxes having a wavelength independent spatial frequency that is associated with a period of the polarizing grating;

a birefringent prism that produces a spatially varying optical path difference (OPD) between orthogonal polarization states associated with the sub-image light fluxes;

a polarization analyzer situated to project at least a portion of orthogonal polarization states of the sub-image light fluxes to a common polarization state;

an array detector situated to receive the projected sub-image light fluxes; and a processor coupled to the array detector that produces a spectral image based on calculations using portions of the sub-image light fluxes associated with the wavelength independent spatial frequency.

2. The interferometer of claim 1, wherein the birefringent prism is a Wollaston prism so as to produce an OPD that varies linearly along a wedge direction.

3. The interferometer of claim 2, further comprising an input polarizer situated to receive light fluxes associated with the sub-images from the object, wherein the input polarizer is oriented to polarize the light fluxes so that at least a portion of the polarized light flux is associated with ordinary ray propagation and extraordinary ray propagation in the Wollaston prism.

4. The interferometer of claim 3, wherein the birefringent prism includes a first Wollaston prism and a second Wollaston prism, and further comprising a half-wave retarder situated between the first and second Wollaston prisms and oriented so as to exchange polarization directions for the sub-image light fluxes received from the first Wollaston prism and directed to the second Wollaston prism.

5. The interferometer of claim 4, wherein the first and second Wollaston prisms are situated so as to be fringe localization compensated (FLC) prisms.

6. The interferometer of claim 1, wherein the birefringent prism includes a first prism pair and a second prism pair, wherein the first and second prism pairs are situated so as to be fringe localization compensated (FLC) prisms.

7. The interferometer of claim 6, wherein the prism pairs are Nomarski prisms or Wollaston prisms.

8. The interferometer of claim 1, further comprising a processor coupled to store recorded sub-images based on the sub-image light fluxes received at the array detector and process the recorded sub-images to produce a spectral image.

9. The interferometer of claim 8, wherein the processor produces the spectral image based on a Fourier transformation of the recorded sub-images.

10. A spectral imaging method, comprising:
directing a plurality of sub-image light fluxes associated with an object to a birefringent prism so as to produce optical path differences between orthogonal states of polarization of the sub-image light fluxes;
transmitting the sub-image light fluxes with the optical path differences to a polarization analyzer;
processing the sub-image light fluxes with at least one polarization grating to produce a wavelength-independent spatial frequency in sub-image light flux interference patterns;
recording intensity patterns based on the polarization analyzed sub-image light fluxes; and
processing the recorded intensity patterns so as to produce a spectral image of the object based on calculations using the wavelength independent spatial frequency.

11. The method of claim 10, wherein the birefringent prism is configured to provide a spatially varying optical path difference between the orthogonal states of polarization.

12. The method of claim 11, wherein the birefringent prism is one or more Wollaston prisms or Nomarski prisms.

13. The method of claim 10, further comprising polarizing the sub-image light fluxes and directing the polarized sub-image light fluxes to the birefringent prism.

14. The method of claim 10, wherein the sub-image light fluxes correspond to sub-images of the object produced by a lens array.

15. A spectral imaging apparatus, comprising, along an axis from an object:
a lens array that produces a plurality of sub-images of an object associated with sub-image light fluxes;
a polarization generator that polarizes the sub-image light fluxes;
a birefringent prism pair situated to receive the polarized sub-image light fluxes such that the sub-image light fluxes propagate in the birefringent prism pair in at least two eigenpolarizations;
a quarter wave retarder situated to receive the sub-image light fluxes from the birefringent pair and produce corresponding circularly polarized light fluxes;
a first polarization grating situated to receive the circularly polarized light fluxes and produce corresponding diffracted light fluxes;
an array detector configured to record the diffracted light fluxes; and
a processor that produces a spectral image based on a Fourier transform of the diffracted light fluxes such that the spectral image is calculated based on detected portions of the recorded diffracted light fluxes associated with a spatial heterodyne frequency based on a period of the polarizing grating.

16. The spectral imaging apparatus of claim 15, further comprising a second polarizing grating, wherein the first and second polarizing gratings are situated so that the spatial heterodyne frequency is based on a product of the periods of the first and second polarizing gratings.

* * * * *